July 23, 1946.  F. A. M. HEPPNER  2,404,767
JET PROPULSION PLANT
Filed April 28, 1943

INVENTOR
Fritz Albert Max Heppner
BY Loyd Hall Sutton
ATTORNEY

Patented July 23, 1946

2,404,767

UNITED STATES PATENT OFFICE 2,404,767

JET PROPULSION PLANT

Fritz Albert Max Heppner, Leamington Spa, England, assignor to Armstrong Siddeley Motors Limited, Coventry, England Application April 28, 1943, Serial No. 484,917
In Great Britain October 28, 1941

2 Claims. (Cl. 60—35.6)

This invention relates to a jet-propulsion, internal-combustion, turbine plant, particularly for use in an aircraft, of the kind having counter-rotatable parts, namely, inner rotors carrying some at least of the compressor and of the turbine blades, and an outer turbine shell carrying some at least of the turbine blades. Preferably the compressor and turbine are of the axial-flow type.

According to the invention, the counter-rotating outer turbine shell carries external air-screw blades.

A further feature of the invention consists in the air dealt with by the air-screw blades being passed into the jet—for example, the plant may have a stationary casing enclosing some at least of the air-screw blades and directing the air passed thereby into the jet.

The main purpose of the invention is to drive the rotatable air-screw blades at slow speed so as to keep the speed of the air relatively to the blades well below sound speed but at the same time to derive the power from a counter-rotating turbine which works under high relative speed. This arrangement provides the effect of a gear between the turbine and the rotatable air-screw blades, without the complication of a mechanical gear.

Figure 1:
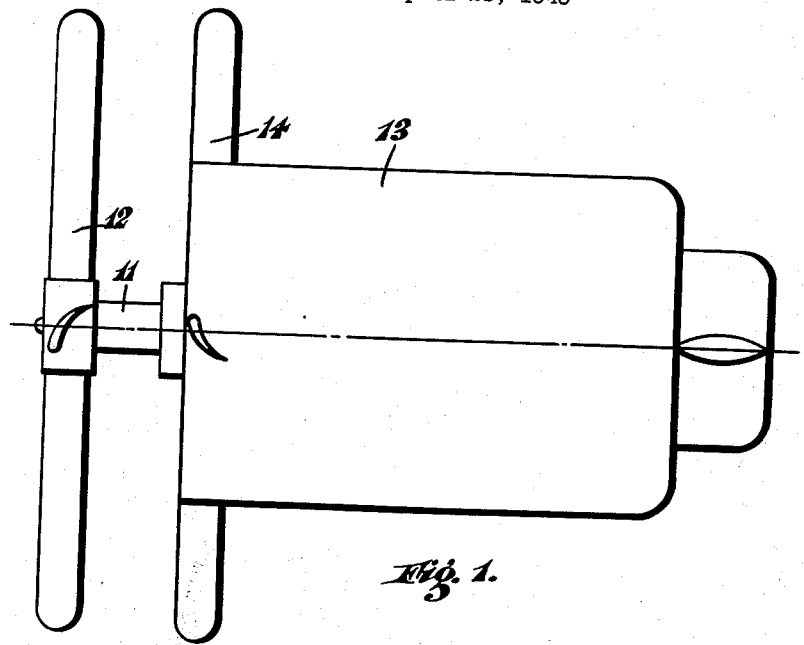
Figure 2:
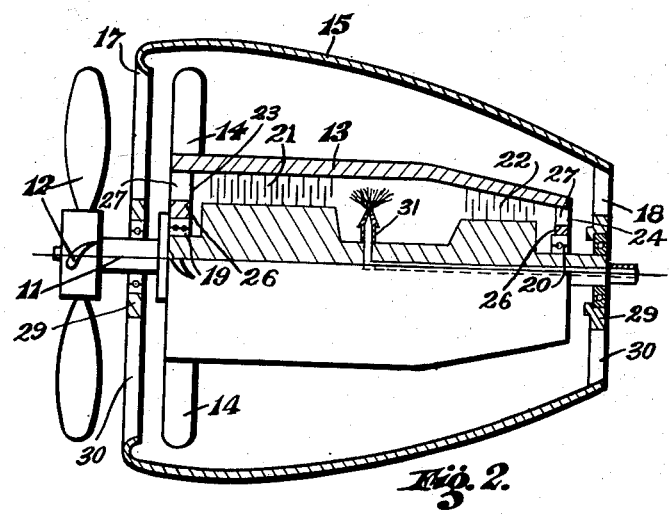

In the accompanying sheet of diagrammatic drawings:

Figure 1 is an elevation showing a simple arrangement according to the invention, with the stationary external casing or cowl omitted; and Figure 2 is a similar view, but with the cowl shown in section.

In the construction shown by Figure 1, 11 represents an inner rotor of the plant having mounted upon it air-screw blades 12, and 13 represents the outer turbine shell of the plant having mounted upon it external air-screw blades 14. The inner rotor 11 carries some of the compressor blades and also some of the blades of the turbine, and in like manner the outer shell 13 carries some of the blades of the turbine. The plant may be of the kind disclosed in U. S. Patent No. 2,360,130. The inner rotor 11 and outer shell 13 rotate in opposite directions and the provision of the counter-rotating air-screw blades renders the plant suitable for use at lower speeds than if jet-propulsion alone were relied upon, due to the fact that a higher expansion takes place in the turbine, so that the final jet speed is decreased.

In the construction of Fig. 2 there is an external casing 15 carrying brackets 17 and 18 fast with the ends of the casing 15 and serving to journal the inner rotor 11 carrying the air-screw blades 12. Journalled on the rotor at 19, 20 is a shell 13 carrying contra-rotating air-screw blades 14 within the casing 15. 21 represents counter-rotating compressor blades and 22 counter-rotating turbine blades. 23 and 24 are brackets supporting the ends of the shell 13 from the bearings 19 and 20. In this embodiment the air from the air-screw blades 14 mixes with the turbine exhaust to constitute a propulsion jet.

Each of the brackets 23, 24 is a spider having an inner hub 26 and arms 27 connecting the hub to the shell 13, air passing between the arms 27 of the bracket 23 to enter the compressor, and the turbine exhaust passing between the arms 27 of the bracket 24.

In a similar way, each of the brackets 17, 18 is a spider having an inner hub 29 and arms 30, between which air can pass, connecting the hubs with the casing 15.

31 indicates a fuel supply means for the air leaving the compressor and entering the turbine.

In this way the jet-propulsion of the plant itself is increased by the external air being directed into the jet.

What I claim as my invention and desire to secure by Letters Patent of the United States is:

1. A jet-propulsion, internal-combustion turbine plant of the axial-flow type including a rotor, compressor and turbine blades carried thereby, a counter-rotating turbine shell radially outside of and enclosing said turbine blades, additional turbine blades carried by said shell internally, said shell having an outlet to provide a jet, external air-screw blades also carried by said shell, and a stationary casing enclosing said air-screw blades and having an outlet communicating with said first named outlet whereby the air dealt with by the air-screw blades joins the turbine exhaust to constitute the propulsion jet.

2. A jet-propulsion, internal-combustion turbine plant of the axial-flow type having an inner turbine rotor and a counter-rotating outer turbine shell, said shell having an outlet to provide a jet, external air-screw blades carried on said shell, and a stationary casing enclosing said air-screw blades and having an outlet communicating with the outlet of said shell for directing the air passed thereby to join the turbine exhaust and constitute the propulsion jet.

FRITZ ALBERT MAX HEPPNER.